US008583798B2

(12) United States Patent
Gusev et al.

(10) Patent No.: US 8,583,798 B2
(45) Date of Patent: Nov. 12, 2013

(54) UNIDIRECTIONAL RESOURCE AND TYPE DEPENDENCIES IN ORACLE CLUSTERWARE

(75) Inventors: Andrey Gusev, Dublin, CA (US); Ashwinee Khaladkar, Mountain View, CA (US); Jonathan Creighton, Oakland, CA (US); Raj K. Kammend, Colleyville, TX (US)

(73) Assignee: Oracle International Corporation, Redwood Shores, CA (US)

( * ) Notice: Subject to any disclaimer, the term of this patent is extended or adjusted under 35 U.S.C. 154(b) by 537 days.

(21) Appl. No.: 12/688,723

(22) Filed: Jan. 15, 2010

(65) Prior Publication Data

US 2011/0179171 A1  Jul. 21, 2011

(51) Int. Cl.
 *G06F 15/173* (2006.01)
(52) U.S. Cl.
 USPC ........... 709/226; 709/223; 709/224; 718/104; 718/105
(58) Field of Classification Search
 None
 See application file for complete search history.

(56) References Cited

U.S. PATENT DOCUMENTS

| | | | |
|---|---|---|---|
| 6,154,849 A * | 11/2000 | Xia | 714/4.3 |
| 6,308,163 B1 | 10/2001 | Du et al. | |
| 6,393,485 B1 * | 5/2002 | Chao et al. | 709/231 |
| 6,516,350 B1 | 2/2003 | Lumelsky et al. | |
| 6,782,408 B1 | 8/2004 | Chandra et al. | |
| 6,931,640 B2 | 8/2005 | Asano et al. | |
| 7,281,045 B2 * | 10/2007 | Aggarwal et al. | 709/226 |
| 7,340,578 B1 | 3/2008 | Khanzode | |
| 7,383,383 B1 | 6/2008 | Bandopadhyay et al. | |
| 7,392,421 B1 | 6/2008 | Bloomstein et al. | |
| 7,451,201 B2 * | 11/2008 | Alex et al. | 709/223 |
| 7,464,147 B1 | 12/2008 | Fakhouri et al. | |
| 7,484,223 B2 | 1/2009 | Hill et al. | |
| 7,581,224 B2 | 8/2009 | Romero | |
| 7,827,302 B2 | 11/2010 | Weinert et al. | |
| 8,020,034 B1 * | 9/2011 | Shrivastava et al. | 714/4.11 |
| 8,154,554 B1 | 4/2012 | Brown et al. | |
| 8,180,922 B2 | 5/2012 | Dini et al. | |
| 2002/0087665 A1 | 7/2002 | Marshall et al. | |
| 2002/0120744 A1 | 8/2002 | Chellis et al. | |
| 2002/0124085 A1 | 9/2002 | Matsuda et al. | |
| 2002/0198984 A1 | 12/2002 | Goldstein et al. | |
| 2002/0198996 A1 | 12/2002 | Sreenivasan et al. | |
| 2004/0226025 A1 | 11/2004 | Beaudoin et al. | |

(Continued)

OTHER PUBLICATIONS

Strohm, Richard, "Oracle Clusterware Adminstration and Deployment Guide", 11g Release 1 (11.1), dated Sep. 2007, 180 pages.

(Continued)

*Primary Examiner* — Mohamed Ibrahim
(74) *Attorney, Agent, or Firm* — Hickman Palermo Truong Becker Bingham Wong LLP (57) ABSTRACT

A clusterware manager configures a resource according to resource attributes values specified by a resource profile. The resource profile conforms to a resource profile syntax that the clusterware manager is configured to interpret pursuant to clusterware manager software. The resource profile syntax prescribes a start dependency syntax defining a dependency between a first resource and a second resource in which the second resource must be in an online state before the first resource is started. The resource profile syntax further prescribes a stop dependency syntax defining a dependency between a first resource and a second resource in which the first resource is brought in an off-line state when the second resource leaves an online state.

22 Claims, 3 Drawing Sheets

(56) References Cited

U.S. PATENT DOCUMENTS

| | | |
|---|---|---|
| 2005/0177628 A1 | 8/2005 | Victoria et al. |
| 2005/0198275 A1 | 9/2005 | D'Alo et al. |
| 2005/0234931 A1 | 10/2005 | Yip et al. |
| 2006/0047813 A1 | 3/2006 | Aggarwal et al. |
| 2006/0053410 A1 | 3/2006 | Charisius et al. |
| 2006/0163338 A1 | 7/2006 | Allen et al. |
| 2006/0195448 A1 | 8/2006 | Newport |
| 2006/0206860 A1 | 9/2006 | Dardinski |
| 2007/0168965 A1 | 7/2007 | Zenz et al. |
| 2007/0174101 A1 | 7/2007 | Li et al. |
| 2008/0021917 A1 | 1/2008 | Baker et al. |
| 2008/0052719 A1 | 2/2008 | Briscoe et al. |
| 2008/0141261 A1 | 6/2008 | Machida |
| 2008/0209397 A1 | 8/2008 | Mohindra et al. |
| 2008/0222642 A1 | 9/2008 | Kakarla et al. |
| 2008/0312982 A1 | 12/2008 | Braun et al. |
| 2008/0320460 A1 | 12/2008 | Miller et al. |
| 2009/0037367 A1* | 2/2009 | Wein .................................. 707/2 |
| 2009/0043809 A1 | 2/2009 | Fakhouri et al. |
| 2009/0054140 A1 | 2/2009 | Beser et al. |
| 2009/0172668 A1* | 7/2009 | Bobak et al. ................... 718/100 |
| 2009/0222540 A1 | 9/2009 | Mishra et al. |
| 2009/0290483 A1 | 11/2009 | Curtis et al. |
| 2009/0328024 A1 | 12/2009 | Li et al. |
| 2010/0064009 A1 | 3/2010 | Chen et al. |
| 2010/0107172 A1 | 4/2010 | Calinescu et al. |
| 2010/0161290 A1 | 6/2010 | Duchenay et al. |
| 2010/0241896 A1 | 9/2010 | Brown et al. |
| 2010/0257535 A1 | 10/2010 | Badovinatz et al. |
| 2010/0332659 A1 | 12/2010 | Marowsky-Bree et al. |
| 2011/0119681 A1 | 5/2011 | Spencer et al. |
| 2011/0125895 A1 | 5/2011 | Anderson et al. |
| 2011/0145392 A1 | 6/2011 | Dawson et al. |
| 2011/0179169 A1 | 7/2011 | Gusev et al. |
| 2011/0179170 A1 | 7/2011 | Gusev et al. |
| 2012/0226788 A1 | 9/2012 | Jackson |

OTHER PUBLICATIONS

Strohm, Richard, "Oracle Clusterware Adminstration and Deployment Guide", 11g Release 1 (11.2), dated Aug. 2009, 322 pages.

* cited by examiner

UNIDIRECTIONAL RESOURCE AND TYPE DEPENDENCIES IN ORACLE CLUSTERWARE

CROSS-REFERENCE TO RELATED APPLICATIONS; BENEFIT CLAIM

This application is related to the following applications:
(1) Appln. Ser. No. 12/688,710, entitled "Special Values in Oracle Clusterware Resource Profiles", filed on Jan. 15, 2010;
(2) Appln. Ser. No. 12/688,715, entitled "'Local Resource' Type As A Way To Automate Management Of Infrastructure Resources In Oracle Clusterware", filed on Jan. 15, 2010;
(3) Appln. Ser. No. 12/688,735, entitled "Self-Testable HA Framework Library Infrastructure", filed on Jan. 15, 2010;
(4) Appln. Ser. No. 12/688,739, entitled "Dependency On A Resource Type", filed on Jan. 15, 2010;
(5) Appln. Ser. No. 12/688,769, entitled "Dispersion Dependency In Oracle Clusterware", filed on Jan. 15, 2010; and
(6) Appln. Ser. No. 12/688,800, entitled "Conditional Dependency in a Computing Cluster", filed on Jan. 15, 2010, the entire contents of each of the above applications is hereby incorporated by reference as if fully set forth herein. The applicants hereby rescind any disclaimer of claim scope in the related applications

FIELD OF THE INVENTION

The present invention relates to management of applications and resources in a clustered computing environment.

BACKGROUND

Clusterware

Clusterware is a general term that refers to a software product that is used to combine a set of nodes or computers into a single entity, all members working together as a logical unit. The single entity is referred to as a cluster or computer cluster. Clusterware allows this cluster to be controlled as a unit. For example, five nodes may be combined into a cluster, each node with its own combination of applications that may be supported by the cluster as a whole. An example of an application that may be installed on some or each of the nodes is a database management system (DBMS), such as those produced by Oracle Corporation, 500 Oracle Parkway, Redwood Shores California.

Clusterware may be implemented as middleware, residing between the operating system and any applications. Clusterware may also be implemented as part of the operating system. A cluster manager, or a node with management authority, manages the resources and services of a cluster. A component of the cluster manager known as the policy engine is the portion of clusterware responsible for managing services on the cluster.

Clusterware Services

Services such as membership services are provided by the clusterware. Membership determines what computers or nodes are parts of the cluster, and which computers and nodes remain in the cluster. If a node that is part of the cluster fails, for example, clusterware membership services determine which other nodes should be included in the cluster.

Resource management is another service provided by clusterware. Resource management techniques may vary with each clusterware product. In some implementations, clusterware considers everything under management as a resource, and with knowledge of resources defined in a resource profile for that resource. A resource is an allocation of hardware and storage, such as one or more operating system processes and volatile virtual memory, and/or volatile memory allocated to running a particular software module or application. In order to function properly, resources may depend on other computer components to be online and/or be configured in a certain way. Such computer components are also referred to as resources.

To manage a resource means to perform activities related to that resource. These activities may, for example, cause the resource to behave, be provisioned in a particular manner, or brought online on a particular node. For example, putting an Internet Protocol (IP) address in the proper configuration location for a web server is a way of managing an IP address, while restarting the web server is a way of managing the web server.

In some implementations, the resource profile controls what the clusterware will do when managing the resource. A resource profile is a collection of attributes having values that define the properties of the resource associated with the value. The attributes and properties may be made up of common or generic attributes and properties, or may be application specific. For example, if the resource crashes, the resource profile defines whether or not the particular resource, given the particular circumstance, will be restarted. As another example, if the resource keeps crashing, it may be relocated to another node in the cluster based on the configuration in the resource profile. Resource profiles may be grouped together to make up a logical group of profiles.

While the cluster model is easily adaptable for modular incremental system growth, actually adding or removing nodes to a cluster can be difficult in practice, as the particular resources attached to a node may vary from node to node. In the context of node removal, resources attached to the node may require shutdown in a particular order or manner that varies by node. Two or more resources may be co-dependent upon one another in a manner that cannot be encapsulated by the statement "Resource A is dependent upon Resource B" and may require customized, hardwired code to specify the proper dependencies.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A clusterware manager configures a resource according to resource attribute values specified by a resource profile. The resource profile conforms to a resource profile syntax that the clusterware manager is configured to interpret pursuant to clusterware manager software.

The resource profile syntax prescribes a start dependency syntax defining a dependency between a first resource and a second resource in which the second resource must be in an online state before the first resource is started. The resource profile syntax further prescribes a stop dependency syntax that defines a dependency between a first resource and a second resource in which the first resource is brought in an off-line state when the second resource leaves an online state.

Sample Cluster Hardware Organization

Figure 1:
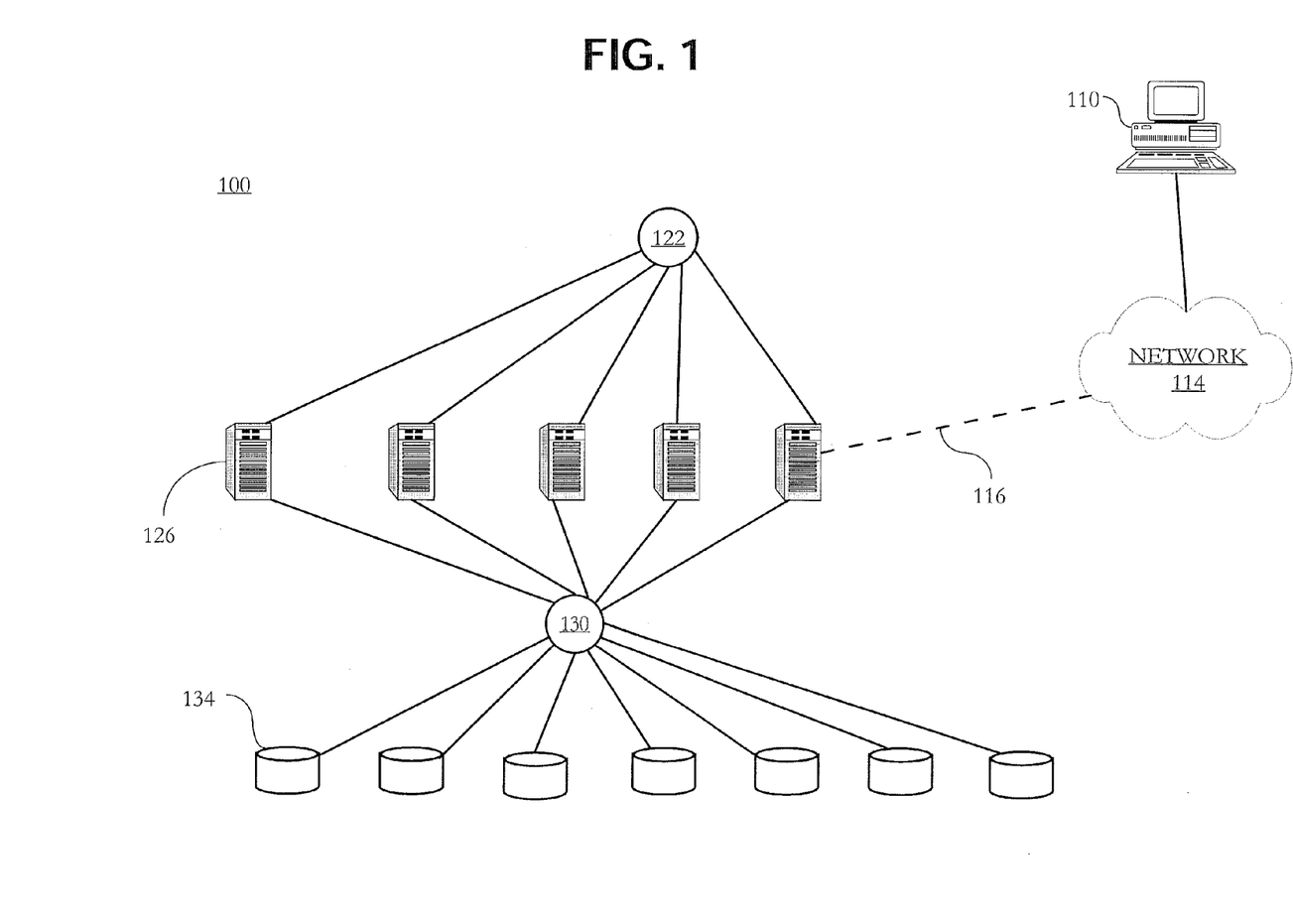
FIG. 1 illustrates hardware organization of a sample cluster upon which embodiments of the invention may be implemented.

FIG. 1 illustrates a sample cluster upon which embodiments of the invention may be implemented. Cluster 100 includes a user group (not shown), network 114, centralized management console 118, interconnect 122, one or more clustered servers 126, switch interconnect 130, and disk subsystem 134.

Users in the user group access network 114 through physical platforms such personal computers, workstations, notebook computers, netbook computers, and handheld devices (not shown in FIG. 1) having network connectivity. Network connectivity may be provided by physically wired connections (such as Ethernet, USB, or FireWire) or may be provided by wireless connections (such as Wi-Fi, Bluetooth, or IrDA). Network 114 provides users access to one or more clustered servers 126, with sample connection illustrated by dashed line 116.

Interconnect 122 is a private local area network among one or more clustered servers 126. Interconnect 122 is used for inter-node messaging and may operate using User Datagram Protocol.

Each of one or more clustered servers 126 is connected to interconnect 122. Servers comprising each of one or more clustered servers 126 may be any computer having a network-capable operating system and providing network services. In an embodiment, servers comprising each of one or more clustered servers 126 may have different operating systems and/or architectures. In an embodiment, servers comprising each of one or more clustered servers 126 share a common operating system and common architecture, for example, 32-bit or 64-bit. Examples include blade servers (such as a Sun Ultrasparc Server Module), rackmount servers (such as a Sun Fire Server), and workstation servers (such as a Sun Ultra Workstation).

Switch interconnect 130 connects one or more clustered servers 126 to disk subsystem 134 (pictorially represented as a plurality of disks). Switch interconnect 130 comprises hardware and software that moves data from each of one or more clustered servers 126 to a desired disk in disk subsystem 134.

Disk subsystem 134 is comprised of a plurality of disks, and may comprise disks having differing physical capacities, differing operating conditions, and differing manufactures. Switch interconnect 130 permits any of one or more clustered servers 126 to access any disk in disk subsystem 130.

While FIG. 1 may appear to depict a static cluster environment, in actual operation various elements of FIG. 1 may vary over time, with the clusterware expected to perform appropriate resource modifications. Users may connect and disconnect in an apparently random fashion, or in a predictable fashion, or in a combination thereof. Servers may be added to, or removed from, the one or more clustered servers 126. Similarly, individual disks may be added to, or removed from, disk subsystem 130. The addition or removal of servers and the addition or removal of individual disks may be planned, as in situations involving upgrades or scheduled maintenance, or may be unplanned, such as an individual disk failure occurring unpredictably.

Sample Cluster Software Organization

Figure 2:
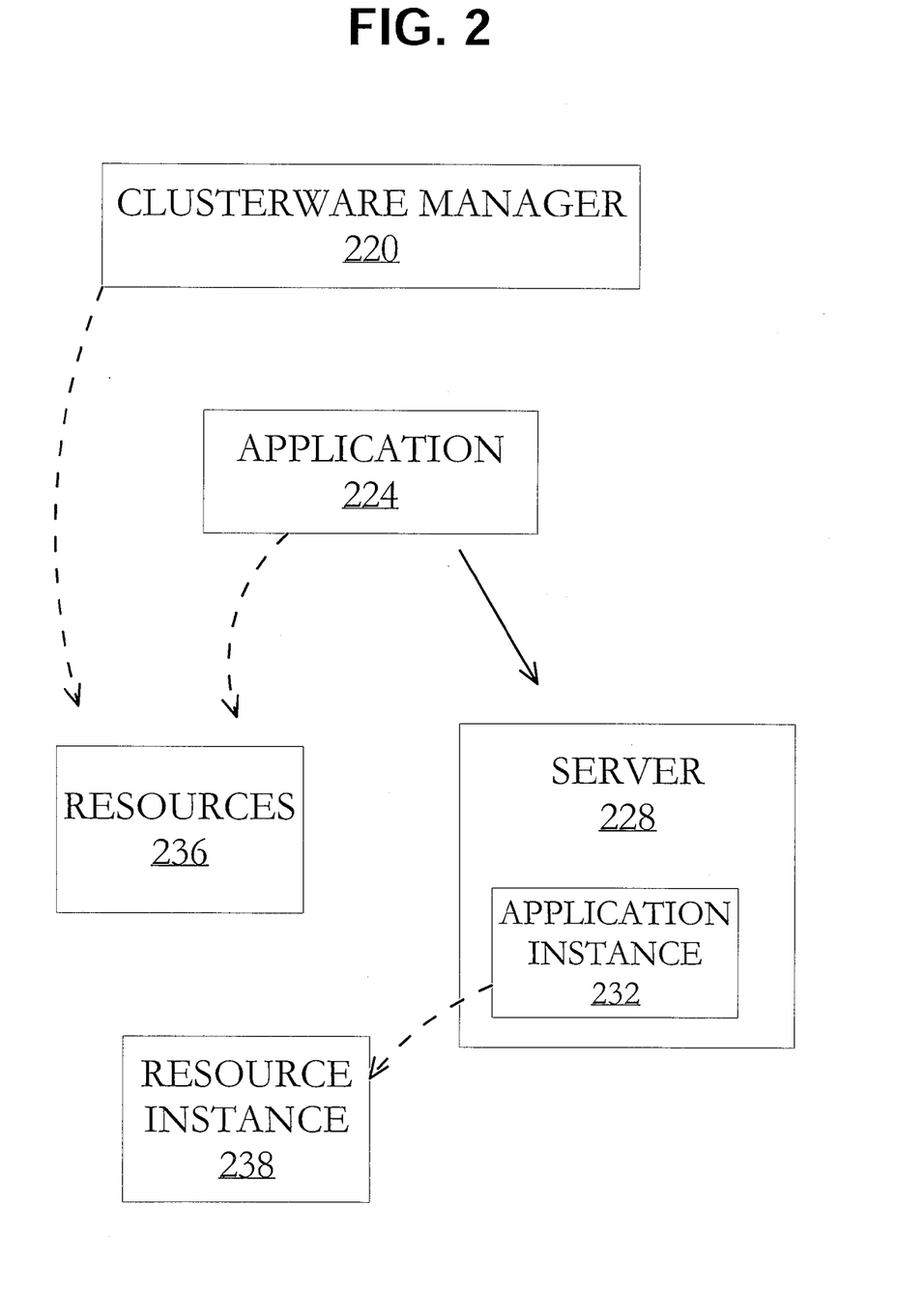
FIG. 2 illustrates a high-level software/hardware organization of a sample cluster in an embodiment of the invention.

FIG. 2 illustrates a high-level software organization of a sample cluster in an embodiment of the invention. Management and operation of cluster 100 is performed by clusterware manager 220. Components of clusterware manager 220 will be described later below. Application 224 operates in conjunction with clusterware manager 220. Application 224 represents a real-world application; in an embodiment, application 224 is a database application.

Server 228 is one of the one or more clustered servers 126 depicted in FIG. 1. Each of the one or more clustered servers 126, such as server 228, may run an application instance 232 of application 224.

Clusterware manager 220 may interact with, or control, one or more resources 236. Similarly, application instance 232, arising from application 224, may also interact with, or control, one or more resource instances 238 of a particular resource of the one or more resources 236. A particular resource (or a particular resource instance) may interact with, or be under the control of, one or both of clusterware manager 220 and application instance 232.

As previously stated, a resource comprises a physical or logical entity included in an application. A resource may comprise an individual software process; for example, an Oracle Grid Naming Service (GNS) process, an Oracle Automatic Storage Management Cluster File System (ACFS) process, a Network File System (NFS) process, or an X Clock process may be a resource. A resource may comprise an application or application instance; for example, an Oracle Automatic Storage Management (ASM) application, or an application produced by SAP, may be a resource.

As the definition of a resource is expansive, in FIG. 2, it is possible for identifiers to overlap for a particular entity. For example, in FIG. 2, server 228 may be considered as a particular resource of the one or more resources 236 with respect to clusterware manager 220.

1. Unidirectional Resource Types and Dependencies

Within a cluster, a particular resource may be dependent upon one or more other resources. A resource's start procedures may have particular constraints or may follow a particular behavior that is not coupled with the resource's stop procedures. Thus a generalized statement such as "Resource A is dependent upon Resource B" may be considered a hard dependency meaning both that: (1) Resource B must be operating before Resource A can be started, and (2) Resource A must be stopped before Resource B is stopped (or if Resource B fails and cannot be restarted). These dependencies are 'bi-directional' in that the first portion of the dependency above relates to the starting of Resource A, whereas the second portion of the dependency above relates to the stopping of Resource A.

As an example, consider a database instance resource modeled with a hard dependency on a Virtual Internet Protocol address (VIP). Thus, the VIP resource must be operating when starting the database instance resource. However, the stopping or failure of the VIP resource should not stop the database instance resource, as the database instance resource may still operate.

As an additional example, consider a database instance resource modeled by a hard dependency to an Apache web server. The database instance resource and the web server share a node in the cluster; the web server provides an external interface to a portion of the database instance. Again, modeling with such a hard resource dependency would cause the database instance to disconnect (or possibly crash) should the web server be relocated from the node or fail on the node. Such behavior could lead to a cascade of unnecessary resource failures.

Modeling dependencies as 'unidirectional' decouples the starting and stopping dependencies from one another, thus allowing for a wider range of activities possible among the resources and the cluster, and significantly lessens the need for customized code to be hardwired into the clusterware to handle special dependencies. Therefore, it also significantly lessens the possibility of dueling decision-making policies to arise during operation of the cluster.

In an embodiment, unidirectional dependencies may be modeled as START dependencies and STOP dependencies.

However, before describing unidirectional dependencies, it is beneficial to describe the possible (operational) states in which a resource may be said to reside at any particular time.

2. Off-Line, Intermediate, Online, and Unknown States of a Resource

A unidirectional dependency, such as a START dependency or a STOP dependency, may be related to the current state of a resource. In an embodiment, at a particular time a resource may be said to reside (or exist) in one of four states: Off-line, Intermediate, Online, and Unknown.

A resource may be said to be "Off-line" when the resource is not available for use due to a physical occurrence; non-limiting examples of such an occurrence making a resource Off-line include a physical disconnection, a power disconnection, and a physical defect.

A resource by be said to be in an "Intermediate" state when the resource is not Off-line, but the resource is proceeding towards entering an "On-line" status; for example, during the powering-up of a resource, such as the booting of a computer, the resource is in an Intermediate state. Additionally, a resource may be said to be in an "Intermediate" state when the resource is in a "sleep" or "hibernate" state entered during periods of non-use as a method to save energy, or when the resource is temporarily non-responsive.

A resource may be said to be in an "Online" state when the resource is immediately available for use.

Finally, a resource not in any one of the Off-line, Intermediate, and Online states may be said to be in an "Unknown" state.

Using such a set of state classifications aids in the modeling accuracy of many types of resources. As a non-limiting example, operation of a laser printer may be described with reference to its possible states. Prior to being powered-on, a laser printer may be considered as Off-line. After power is switched on and the printer toner cartridge heats to proper temperature, the printer is in its Intermediate state. Once the toner cartridge is fully heated, and printing is possible, the printer enters its On-line state. While printing, should the printer run out of paper, the printer enters its Intermediate state. Later, should the printer hang due to an incomplete or corrupt print job, the printer enters an Unknown state.

In an embodiment, one or more resource states are parameters of a START dependency. In an embodiment, one or more resource states are parameters of a STOP dependency.

With reference to a set of resource states, both START and STOP dependencies described below for a resource may be better understood. Dependencies are applied by clusterware manager 220 when a resource state changes from a "running" to "not-running" form, and vice-versa. A resource is said to be "running" when the resource is either in the Online or Intermediate state. A resource is said to be "not-running" when the resource is either in the Off-line or Unknown state.

A resource usually transitions between running and not-running as a result of either a planned operation (such as when an administrator requests the transition through some interface), or an unplanned state transition (such as a failure of the resource or node). When a resource transitions from not-running to running, applicable START dependencies may be applied by clusterware manager 220. When a resource transitions from running to not-running, applicable STOP dependencies may be applied by clusterware manager 220.

3. Hard and Weak START Dependencies

In an embodiment, a START dependency may be used to specify a hard dependency or a weak dependency.

If Resource A has a hard START dependency on Resource B, Resource B must be Online before Resource A will be started. However, Resource A and Resource B may be located on different nodes of the cluster.

An example of a hard START dependency appearing in a resource profile could be the line:

START_DEPENDENCIES=hard(name_of_resource)

where "name_of resource" is replaced with the name of the resource. In the VIP example presented above, the hard START dependency may appear in a particular resource profile as:

START_DEPENDENCIES=hard(ora.nodename.vip)

and would specify that the VIP must be Online before the particular resource will be started.

A parameter may be applied to a hard dependency to further qualify the behavior of a particular resource. In an embodiment, an "intermediate" qualifier may be used with a hard START dependency. If Resource A has a hard-intermediate START dependency on Resource B, Resource B must be in either the Online or Intermediate state before Resource A will be started.

If Resource A has a weak START dependency on Resource B, an attempt to start Resource A will attempt to start Resource B, if Resource B is not Online, i.e., Resource B is Off-line, or in an Intermediate or Unknown state. However, the result of attempting to start Resource B has no influence on the status of Resource A, e.g., Resource A may successfully start but Resource B may fail to start. Similarly, the result of attempting to start Resource A has no influence on the status of Resource B, e.g., Resource A may fail to start but Resource B successfully starts.

An example of a weak START dependency appearing in a resource profile could be the line:

START_DEPENDENCIES=weak(name_of_resource)

where "name_of_resource" is replaced with the name of the resource. For example, a database instance's resource profile could attempt to start a software program, such as a database listener, at the node that is to host the database instance:

START_DEPENDENCIES=weak(ora.LISTENER.lsnr)

resulting in a start attempt of the database listener as part of the start up of the database instance. However, the inability of the database listener to go online (for whatever reason) would not affect the starting of the database instance.

In an embodiment, a resource profile for a particular resource contains one or more START dependencies that describe at least one hard or weak dependency the particular resource has with respect to another resource, regarding the start-up of the particular resource.

4. Hard STOP Dependencies

In an embodiment, a STOP dependency may be used to specify a hard dependency.

If Resource A has a hard STOP dependency on Resource B, Resource A must be stopped when Resource B enters one of the following states: Intermediate, Off-line, and Unknown.

An example of a hard STOP dependency appearing in a resource profile could be the line:

STOP_DEPENDENCIES=hard(name_of_resource)

where "name_of_resource" is replaced with the name of the resource. For example, a customer service application, e.g., CRM (Resource A) that accesses a database (Resource B) must be stopped when the database is unavailable. The resulting resource profile for the customer service application may include a line such as:

STOP_DEPENDENCIES=hard(database)

As illustrated above with respect to START dependencies, a parameter may be applied to a hard STOP dependency to further qualify the behavior of a particular resource. In an embodiment, an "intermediate" qualifier may be used with a hard STOP dependency. If Resource A has a hard-intermediate STOP dependency on Resource B, Resource A must be stopped when Resource B enters one of the following states: Off-line and Unknown. Thus the distinction between hard and hard-intermediate STOP dependencies is related to the desired behavior for Resource A when Resource B enters its Intermediate state.

5. Example Behaviors Possible Through Unidirectional Dependencies

Through use of unidirectional dependencies, it possible to specify and enforce many resource behaviors impossible to achieve through bi-directional dependencies. Non-limiting examples include the following:

a. Specify a uni-directional dependency. A hard dependency from an Oracle listener on a VIP is enforced at listener start time and not thereafter. Thus a failure of the VIP, or a request by the administrator to unregister the IP address, will have no effect on the database resource. In this example, the resource profile may include the lines:
START_DEPENDENCIES=hard(my_vip)
STOP_DEPENDENCIES= b. Specify different dependencies in each direction. A first application may require a weak dependency on a second application at start-up of the first application; however should the first application start and later fail, the first application may require a hard dependency on the second application at stop time. In this example, the resource profile for the first application may include the lines:
START_DEPENDENCIES=weak(second_application)
STOP_DEPENDENCIES=hard(second_application)

c. Specify different modifiers in each direction. Treatment of a resource having an Intermediate state may be controlled independently in each direction. At start time, the Intermediate state may be treated as insufficient to satisfy a hard dependency. However, once the dependency is satisfied, it is possible to allow the resource to satisfy a stop dependency when the resource enters the resource's Intermediate state. In this example, the resource profile may include the lines:
START_DEPENDENCIES=hard(my_application)
STOP_DEPENDENCIES=hard(intermediate:my_application)

d. Place a scope modifier on a dependency. Dependency relations, such as hard or weak, have a scope with respect to a node. The scope may be either local or global. A dependency having a local scope must be satisfied with two resources on the same node, whereas a dependency having a global scope must be satisfied with two resources, with each resource on a different node of the cluster. A scope is local by default. However, a special modifier (called "global") may be used in conjunction with the relation specification to override the default, local scope. For example, a HTTP Server→VIP hard start dependency has a local scope. However, consider a web page archiving application (which archives pages as the pages are shown to users by an HTTP server) that has a start dependency on the HTTP server. The web page archiving application may prefer, but not require, that the HTTP sever be local.

Thus a use a global dependency modifier may be used to indicate the "http_server" resource may be running/started anywhere in the cluster:

START_DEPENDENCY=hard(global:http_server)

As with the other modifiers described above, this modifier may be specifically or individually applied for each START and STOP directions.

Thus, through use of unidirectional dependencies, it is possible to solve various applications' requirements for dependencies 'by configuration,' as opposed to 'by implementation.' Instead of forcing a developer or user to write new code when implementing an application on top of the clusterware, the developer or user may simply specify the required behavior in the configuration, using the resource profiles.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
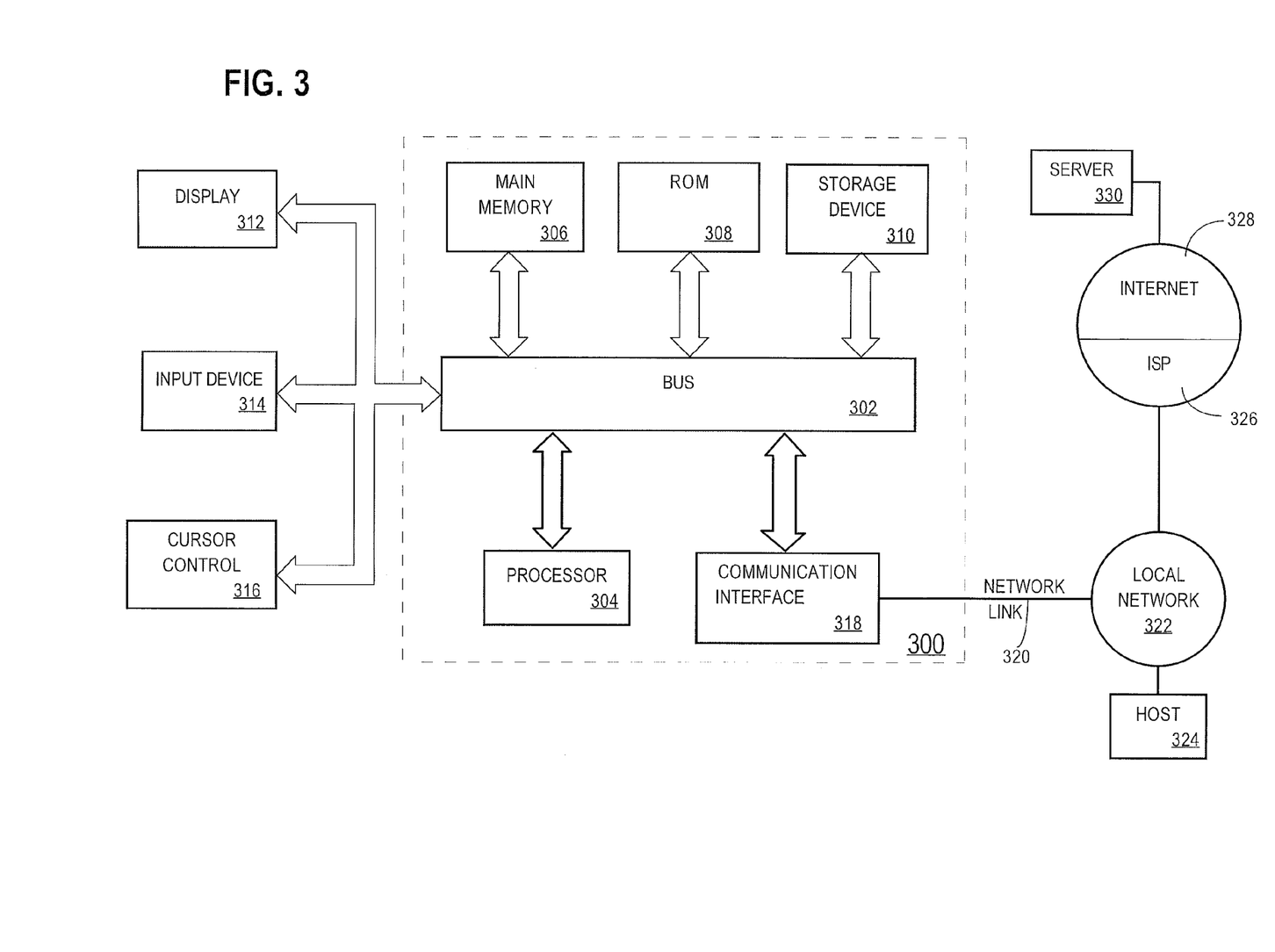
FIG. 3 illustrates a block diagram of a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
configuring a resource, by a clusterware manager, according to resource attributes values specified by a resource profile, said resource profile conforming to a resource profile syntax that said clusterware manager is configured to interpret;
   wherein said resource profile syntax prescribes:
      a start dependency syntax defining a start dependency between a particular resource and another resource in which a condition of the particular resource being started is that the other resource be in a first operating state; and
      a stop dependency syntax defining a stop dependency between the particular resource and the other resource in which a condition of the particular resource being stopped is that the other resource leave a second operating state,
         wherein the second operating state is different than the first operating state and
         wherein the start dependency and the stop dependency are decoupled from each other; and
   wherein the method is performed by one or more computing devices.

2. The method of claim 1, wherein a resource that leaves an operating state enters one of the following states: intermediate, off-line, and unknown.

3. The method of claim 1, wherein the start dependency syntax further defines a dependency in which an attempt to start the particular resource causes an attempt to start the other resource if the other resource is in either an offline, intermediate or unknown state.

4. The method of claim 1, wherein the start dependency syntax further defines a dependency in which a condition of the particular resource being started is that the other resource be in either an online state or an intermediate state.

5. The method of claim 1, wherein the stop dependency syntax further defines a dependency in which a condition of the particular resource being stopped is that the other resource enters either an off-line state or an unknown state.

6. The method of claim 1, wherein at least one of the start dependency syntax and the stop dependency syntax further defines a scope.

7. A non-transitory computer-readable storage that stores instructions which, when executed by one or more processors, cause the one of more processors to perform the steps of:
configuring, by a clusterware manager, a resource according to resource attributes values specified by a resource profile, said resource profile conforming to a resource profile syntax that said clusterware manager is configured to interpret;
   wherein said resource profile syntax prescribes:
      a start dependency syntax defining a start dependency between a particular resource and another-resource in which a condition of the particular resource being started is that the other resource be in a first operating state; and
      a stop dependency syntax defining a stop dependency between the particular resource and the other resource in which a condition of the particular resource being brought in an off-line state is that the other resource leave a second operating state, wherein the start dependency and the stop dependency are decoupled from each other, and wherein the second operating state is different from the first operating state.

8. The non-transitory computer-readable storage of claim 7, wherein a resource that leaves an operating state enters one of the following states:
intermediate, off-line, and unknown.

9. The non-transitory computer-readable storage of claim 7, wherein the start dependency syntax further defines a dependency in which an attempt to start the particular resource causes an attempt to start the other resource.

10. The non-transitory computer-readable storage of claim 7, wherein the start dependency syntax further defines a dependency in which a condition of the particular resource being started is that the other resource be in either an online state or an intermediate state.

11. The non-transitory computer-readable storage of claim 7, a dependency in which a condition of the particular resource being stopped is that the other resource enters either an off-line state or an unknown state.

12. The non-transitory computer-readable storage of claim 7, wherein at least one of the start dependency syntax and the stop dependency syntax further defines a scope.

13. A method, comprising:
configuring, by a clusterware manager, a resource according to resource attributes values specified by a resource profile, said resource profile conforming to a resource profile syntax that said clusterware manager is configured to interpret;
   wherein said resource profile syntax prescribes:
      a start dependency syntax defining a start dependency between a first resource and a second resource in which a condition of the first resource being started is that the second resource be in an online state; and
      a stop dependency syntax defining a stop dependency between a first resource and a second resource in which a condition of the first resource being brought in an off-line state is that the second resource leave an online state, wherein the start dependency and the stop dependency are decoupled from each other;
   wherein the method is performed by one or more computing devices.

14. The method of claim 13, wherein a resource that leaves the online state enters one of the following states: intermediate, off-line, and unknown.

15. The method of claim 13, wherein the start dependency syntax further defines a dependency in which an attempt to start the first resource causes an attempt to start the second resource if the second resource is in an offline, intermediate, or unknown state.

16. The method of claim 13, wherein the start dependency syntax further defines a dependency in which a condition of the first resource being started is that the second resource be in either an online state or an intermediate state.

17. The method of claim 13, wherein the stop dependency syntax further defines a dependency in which a condition of the first resource being stopped is that the second resource enter either an off-line state or an unknown state.

18. A non-transitory computer-readable storage that stores instructions which, when executed by one or more processors, cause the one of more processors to perform the steps of:
configuring, by a clusterware manager, a resource according to resource attributes values specified by a resource profile, said resource profile conforming to a resource profile syntax that said clusterware manager is configured to interpret pursuant to clusterware manager software;

wherein said resource profile syntax prescribes:

a start dependency syntax defining a start dependency between a first resource and a second resource in which a condition of the first resource being started is that the second resource be in an online state; and a stop dependency syntax defining a stop dependency between a first resource and a second resource in which a condition of the first resource being brought in an off-line state is that the second resource leave an online state, wherein the start dependency and the stop dependency are decoupled from each other.

19. The non-transitory computer-readable storage of claim 18, wherein a resource that leaves the online state enters one of the following states: intermediate, off-line, and unknown.

20. The non-transitory computer-readable storage of claim 18, wherein the start dependency syntax further defines a dependency in which an attempt to start the first resource causes an attempt to start the second resource if the second resource is in an offline, intermediate, or unknown state.

21. The non-transitory computer-readable storage of claim 18, wherein the start dependency syntax further defines a dependency in which a condition of the first resource being started is that the second resource be in either an online state or an intermediate state.

22. The non-transitory computer-readable storage of claim 18, wherein the stop dependency syntax further defines a dependency in which a condition of the first resource being stopped is that the second resource enter either an off-line state or an unknown state.

* * * * *

UNITED STATES PATENT AND TRADEMARK OFFICE
CERTIFICATE OF CORRECTION

PATENT NO.        : 8,583,798 B2
APPLICATION NO.   : 12/688723
DATED             : November 12, 2013
INVENTOR(S)       : Gusev et al.

It is certified that error appears in the above-identified patent and that said Letters Patent is hereby corrected as shown below:

On the Title Page, Item (56)

Column 2, under "Other Publications", line 1, delete "Adminstration" and insert -- Administration --, therefor.

On page 2, column 2, under "Other Publications", line 1, delete "Adminstration" and insert -- Administration --, therefor.

In the Specification

In column 1, line 26, after "applications" insert -- . --.

In column 6, line 39, delete "name_of resource" and insert -- name_of_resource --, therefor.

In column 7, line 51, delete "uni-directional" and insert -- unidirectional --, therefor.

In column 8, line 26, delete "sever" and insert -- server --, therefor.

In the Claims

In column 11, line 50, in Claim 7, delete "of" and insert -- or --, therefor.

In column 11, line 58, in Claim 7, delete "another-resource" and insert -- another resource --, therefor.

In column 12, line 25, in Claim 13, delete "method," and insert -- method --, therefor.

In column 12, line 64, in Claim 18, delete "of" and insert -- or --, therefor.

Signed and Sealed this
Eighth Day of September, 2015

Michelle K. Lee
*Director of the United States Patent and Trademark Office*